(12) United States Patent
Kubota et al.

(10) Patent No.: US 9,748,032 B2
(45) Date of Patent: Aug. 29, 2017

(54) INDUCTOR ARRAY CHIP AND DC-DC CONVERTER

(71) Applicant: Murata Manufacturing Co., Ltd., Nagaokakyo-shi, Kyoto-fu (JP)

(72) Inventors: Yoshihiro Kubota, Nagaokakyo (JP); Takashi Noma, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 142 days.

(21) Appl. No.: 14/685,797

(22) Filed: Apr. 14, 2015

(65) Prior Publication Data

US 2015/0221428 A1    Aug. 6, 2015

Related U.S. Application Data

(60) Division of application No. 14/068,046, filed on Oct. 31, 2013, now abandoned, which is a continuation of application No. PCT/JP2012/079495, filed on Nov. 14, 2012.

(30) Foreign Application Priority Data

Apr. 17, 2012  (JP) .................. 2012-093756

(51) Int. Cl.
  *H01F 5/00*    (2006.01)
  *H01F 27/28*   (2006.01)
  *H02M 3/158*   (2006.01)
  *H02M 1/00*    (2006.01)

(52) U.S. Cl.
  CPC ........... *H01F 27/2804* (2013.01); *H01F 5/00* (2013.01); *H02M 3/158* (2013.01); *H01F 2027/2809* (2013.01); *H02M 2001/008* (2013.01); *Y10T 307/406* (2015.04)

(58) Field of Classification Search
  CPC ............................................. H01F 27/00–27/30
  USPC .................................... 336/65, 83, 200, 232
  See application file for complete search history.

(56) References Cited

U.S. PATENT DOCUMENTS 6,480,087 B1    11/2002  Oiwa et al.
2009/0201005 A1   8/2009  Noma et al.

FOREIGN PATENT DOCUMENTS

CN          101529707 A    9/2009

OTHER PUBLICATIONS

Kubota et al., "Inductor Array Chip and DC-DC Converter", U.S. Appl. No. 14/068,046, filed Oct. 31, 2013.

*Primary Examiner* — Tuyen Nguyen
(74) *Attorney, Agent, or Firm* — Keating & Bennett, LLP

(57) ABSTRACT

An inductor array chip includes a magnetic laminated body and a plurality of inductors. The magnetic laminated body includes a plurality of stacked magnetic layers. The plurality of inductors are arranged inside the magnetic laminated body. The inductance of a first inductor differs from the inductance of a second inductor. The inductors include a plurality of coil-shaped conductors and via-hole conductors. The plurality of coil-shaped conductors are arranged between the magnetic layers. The via-hole conductors electrically connect the plurality of coil-shaped conductors. The inductors include a plurality of inductors in which the section sizes of the coil-shaped conductors differ from one another.

9 Claims, 6 Drawing Sheets

INDUCTOR ARRAY CHIP AND DC-DC CONVERTER

BACKGROUND OF THE INVENTION

1. Field of the Invention

The present invention relates to an inductor array chip and a DC-DC converter including the inductor array chip.

2. Description of the Related Art

DC-DC converters have been known as elements having a function of outputting power at a voltage different from input power (see, for example, Japanese Patent No. 4325747). A DC-DC converter described in Japanese Patent No. 4325747 includes an inductor chip including inductors, and a control chip and a capacitor chip that are arranged on the inductor chip.

Regarding DC-DC converters, outputting a plurality of types of power, in which at least one of current and voltage differs among the plurality of types of power, from a single DC-DC converter, has been demanded. A DC-DC-converter that meets the above-mentioned demand may include a plurality of converting units. In the case where a plurality of types of converting units in which at least one of the voltage and current of output power differs among the plurality of types of converting units are arranged in a DC-DC converter, it is desirable that the inductance characteristics (for example, an inductance and an Rdc value) of each of the converting units can be adjusted in order to optimize the characteristics of the converting unit.

For example, in the case where an inductor chip including inductors arranged as in the DC-DC converter described in Japanese Patent No. 4325747 is used, a plurality of types of inductors whose number of stacked coil-shaped conductors greatly differs from one another may be arranged within a single inductor chip. However, in the case where a plurality of types of inductors whose number of stacked coil-shaped conductors differs from one another are arranged within a single inductor chip, a structural defect (a crack or the like) is likely to occur within a magnetic laminated body at the time of firing the inductor chip. Accordingly, there is a problem in that it is difficult to produce, with good stability, an inductor array chip including a plurality of types of inductors whose number of stacked coil-shaped conductors differs from one another.

SUMMARY OF THE INVENTION

Preferred embodiments of the present invention provide an inductor array chip in which a structural defect is less likely to occur at a time of firing and which is easily produced with good stability.

An inductor array chip according to a preferred embodiment of the present invention includes a magnetic laminated body and a plurality of inductors. The magnetic laminated body includes a plurality of stacked magnetic layers. The plurality of inductors are arranged inside the magnetic laminated body. The inductances of the plurality of inductors differ from one another. The plurality of inductors each include a plurality of coil-shaped conductors and a via-hole conductor. The plurality of coil-shaped conductors are each arranged between the magnetic layers. The via-hole conductor electrically connects the plurality of coil-shaped conductors. The plurality of inductors include a plurality of inductors in which a plurality of coil-shaped conductors have different section sizes.

In an inductor array chip according to a preferred embodiment of the present invention, an inductance of an inductor including a plurality of coil-shaped conductors having a relatively small section size is greater than an inductance of an inductor including a plurality of coil-shaped conductors having a relatively large section size.

In an inductor array chip according to another preferred embodiment of the present invention, an inductance of an inductor including a plurality of coil-shaped conductors having a relatively small section size is smaller than an inductance of an inductor including a plurality of coil-shaped conductors having a relatively large section size.

In an inductor array chip according to another preferred embodiment of the present invention, in the plurality of inductors in which the plurality of coil-shaped conductors have different section sizes, coil diameters of the coil-shaped conductors differ from one another.

In an inductor array chip according to another preferred embodiment of the present invention, an inductor including a plurality of coil-shaped conductors having a relatively small section size has a coil diameter smaller than a coil diameter of an inductor including a plurality of coil-shaped conductors having a relatively large section size.

In an inductor array chip according to another preferred embodiment of the present invention, an inductor including a plurality of coil-shaped conductors having a relatively small section size has a coil diameter greater than a coil diameter of an inductor including a plurality of coil-shaped conductors having a relatively large section size.

In an inductor array chip according to another preferred embodiment of the present invention, the same number of coil-shaped conductors are included in each of the plurality of inductors.

In an inductor array chip according to another preferred embodiment of the present invention, in at least one of the plurality of inductors, the via-hole conductors electrically connect the plurality of coil-shaped conductors such that the inductor includes a plurality of inductor units connected in parallel to one another.

In an inductor array chip according to another preferred embodiment of the present invention, the plurality of inductors include a plurality of inductors each including a plurality of inductor units. In the plurality of inductors each including the plurality of inductor units, connection configurations of the plurality of inductor units differ from one another.

A DC-DC converter according to yet a further preferred embodiment of the present invention includes an inductor array chip according to one of the preferred embodiments of the present invention described above.

According to various preferred embodiments of the present invention, an inductor array chip in which a structural defect is less likely to occur at the time of firing and which is easily produced with good stability is reliably provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
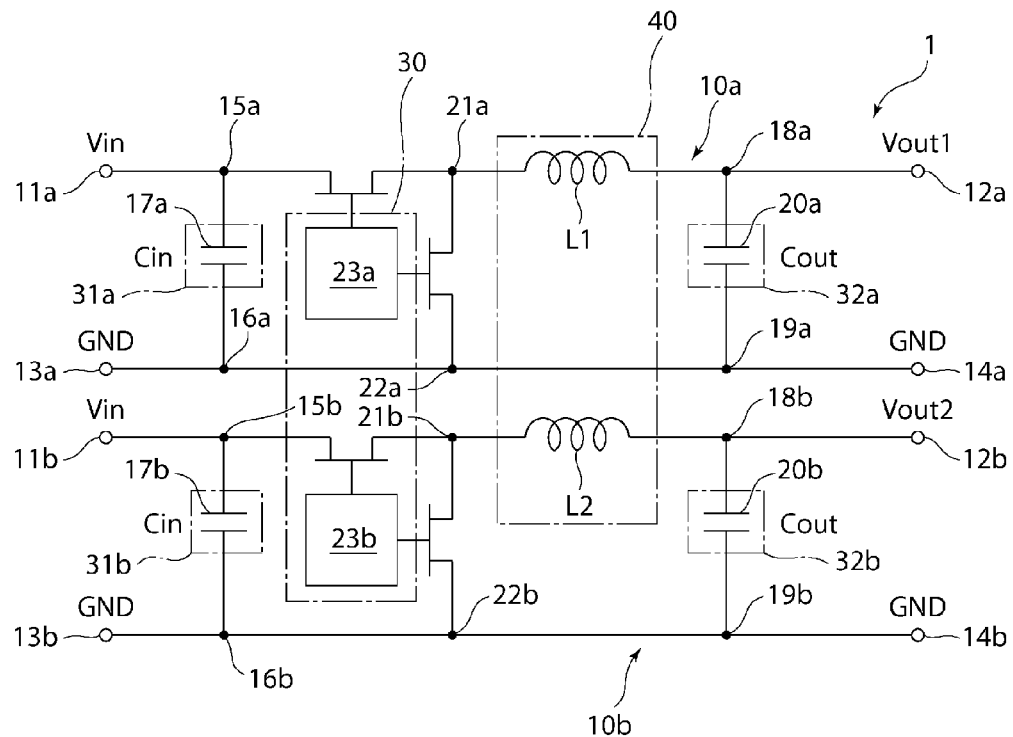
FIG. 1 is a schematic circuit diagram of a DC-DC converter according to a first preferred embodiment of the present invention.

Hereinafter, preferred embodiments of the present invention will be described. However, the preferred embodiments described below are merely examples. The present invention is not limited by the preferred embodiments described below.

Furthermore, in the drawings referred to in the description of the preferred embodiments and the like, members having substantially the same function are referred to with the same reference sign. Furthermore, the drawings referred to in describing the preferred embodiments and the like are schematically illustrated, and the ratio of the dimensions and the like of objects rendered in the drawings may be different from the ratio of the dimensions of the actual objects. The ratio of the dimensions and the like of objects may differ from drawing to drawing. The specific dimension ratio and the like of objects should be determined in consideration of the explanations provided below.

First Preferred Embodiment

FIG. 1 is a schematic circuit diagram illustrating a DC-DC converter according to the first preferred embodiment of the present invention. First, the circuit configuration of a DC-DC converter 1 will be explained with reference to FIG. 1.

The DC-DC converter 1 includes a plurality of converting units. More specifically, the DC-DC converter 1 preferably includes two converting units 10a and 10b. The converting units 10a and 10b may be connected to the same power supply or may be connected to individual power supplies. The output power of the converting unit 10a and the output power of the converting unit 10b are different in at least one of current and voltage. More specifically, in this preferred embodiment, power at the same input voltage Vin is input to each of the converting units 10a and 10b. The converting unit 10a outputs power at a first output voltage Vout1. The converting unit 10b outputs power at a second output voltage Vout2.

The converting units 10a and 10b include input terminals 11a and 11b, output terminals 12a and 12b, first ground terminals 13a and 13b, and second ground terminals 14a and 14b.

Input-side capacitors 17a and 17b are connected between points 15a and 15b, which are located on wiring lines connecting the input terminals 11a and 11b and the output terminals 12a and 12b together, and points 16a and 16b, which are located on wiring lines connecting the first ground terminals 13a and 13b and the second ground terminals 14a and 14b together. Output-side capacitors 20a and 20b are connected between points 18a and 18b, which are located on wiring lines connecting the points 15a and 15b and the output terminals 12a and 12b together, and points 19a and 19b, which are located on wiring lines connecting the points 16a and 16b and the second ground terminals 14a and 14b together.

The converting units 10a and 10b include controllers 23a and 23b. The controllers 23a and 23b are arranged and programmed to turn on/off connections between the points 15a and 15b and points 21a and 21b, and turn on/off connections between the points 21a and 21b, which are located on wiring lines connecting the points 15a and 15b and the points 18a and 18b together, and points 22a and 22b, which are located on wiring lines connecting the points 16a and 16b and points 19a and 19b together. More specifically, the controllers 23a and 23b selectively switch between a first state in which connection between the points 15a and 15b and the points 21a and 21b is turned on and connection between the points 21a and 21b and the points 22a and 22b is turned off and a second state in which connection between the points 15a and 15b and the points 21a and 21b is turned off and connection between the points 21a and 21b and the points 22a and 22b is turned on.

Inductors L1 and L2 are connected between the points 21a and 21b and the points 18a and 18b. As described above, the first output voltage Vout1 differs from the second output voltage Vout2. Thus, in order to optimize the characteristics of each of the converting units, the inductance of the inductor L1 and the inductance of the inductor L2 are set to be different from each other.

Figure 2:
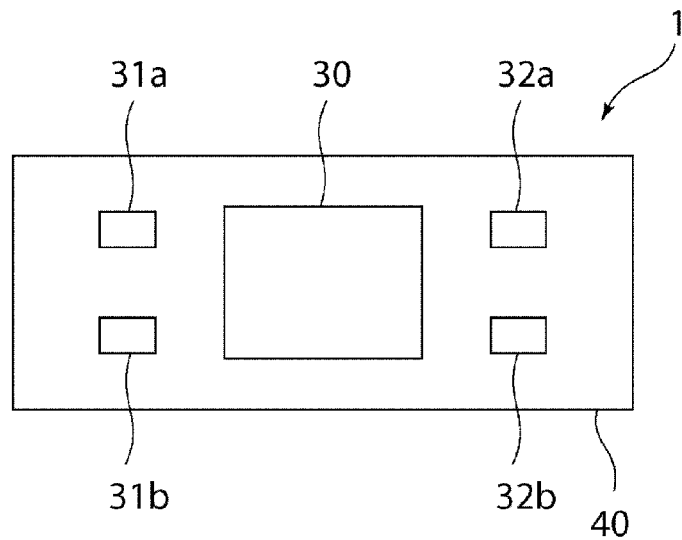
FIG. 2 is a schematic plan view of the DC-DC converter according to the first preferred embodiment of the present invention.

Next, the specific configuration of the DC-DC converter 1 will be described mainly with reference to FIG. 2. The DC-DC converter 1 includes an inductor array chip 40, an IC chip 30, and capacitor chips 31a, 31b, 32a, and 32b. The inductor array chip 40 is arranged as a substrate including built-in inductors and includes the inductors L1 and L2 illustrated in FIG. 1. The IC chip 30 and the capacitor chips 31a, 31b, 32a, and 32b are arranged on the inductor array chip 40. The IC chip 30 includes the controllers 23a and 23b and FETs (no reference number) serving as switch elements. The capacitor chips 31a and 31b include the input-side capacitors 17a and 17b. The capacitor chips 32a and 32b include the output-side capacitors 20a and 20b.

Figure 3:
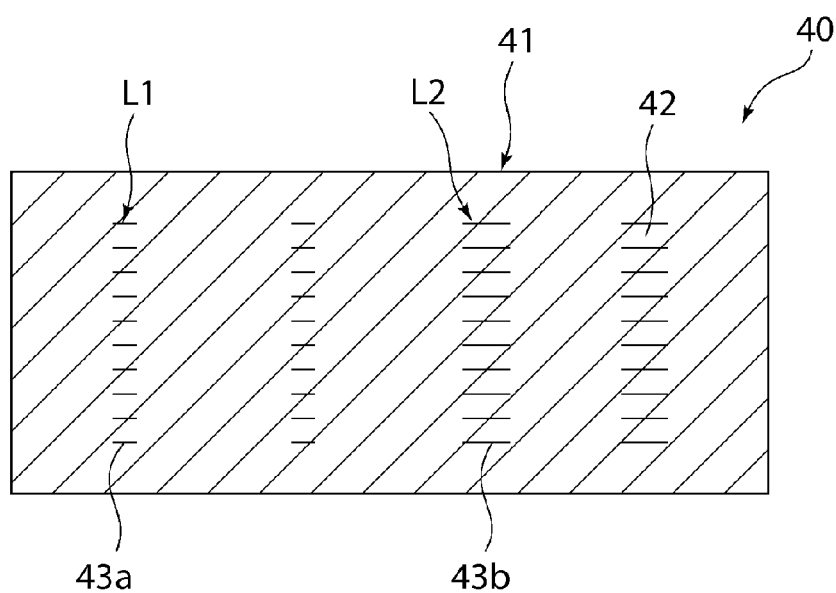
FIG. 3 is a schematic cross-sectional view of an inductor array chip in the first preferred embodiment of the present invention.
Figure 4:
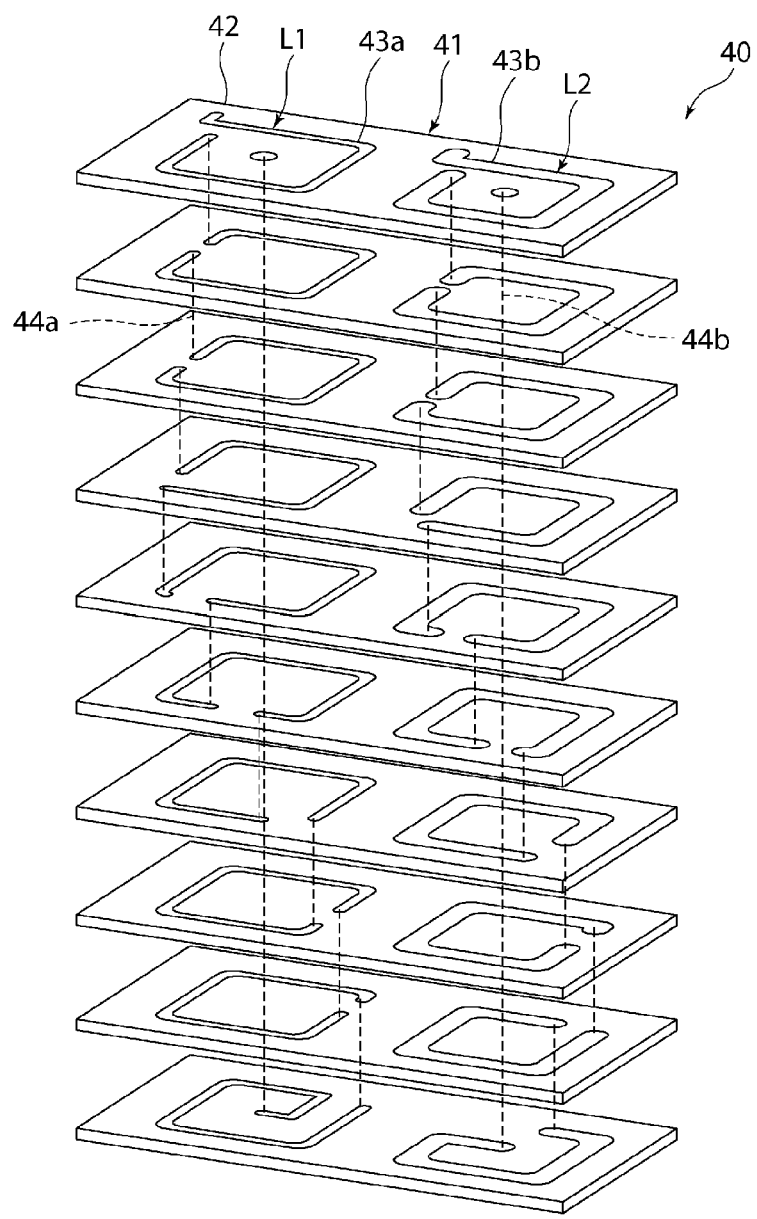
FIG. 4 is a schematic exploded perspective view of a portion of the inductor array chip in the first preferred embodiment of the present invention.

FIG. 3 is a schematic cross-sectional view of the inductor array chip 40 in the first preferred embodiment. FIG. 4 is a schematic exploded perspective view of a portion of the inductor array chip 40 in the first preferred embodiment. In FIG. 4, illustration of a magnetic layer defining an outer layer portion of the inductor array chip 40 is omitted.

As illustrated in FIGS. 3 and 4, the inductor array chip 40 includes a magnetic laminated body 41 including a plurality of stacked magnetic layers 42. The magnetic layers 42 may be each made of, for example, magnetic ceramics such as ferrite. The number of magnetic layers 42 defining the magnetic laminated body 41 can be appropriately set in accordance with characteristics and the like required for the inductor array chip 40. The number of magnetic layers 42 defining the magnetic laminated body 41 may be set to, for example, about 8 to about 12. The thickness of each of the magnetic layers 42 can also be appropriately set in accordance with characteristics and the like required for the inductor array chip 40. The thickness of each of the magnetic layers 42 may be set to, for example, about 3 µm to about 50 µm.

The inductors L1 and L2 are arranged inside the magnetic laminated body 41. The inductors L1 and L2 include a plurality of coil-shaped conductors 43a and 43b and via-hole conductors 44a and 44b (see FIG. 4). The number of coil-shaped conductors 43a in the inductor L1 and the number of coil-shaped conductors 43b in the inductor L2 preferably are the same. However, in the present invention, the number of coil-shaped conductors (the number of layers) is not necessarily the same among a plurality of inductors. That is, although it is desirable that the number of layers of coil-shaped conductors in the inductor L1 and the number of layers of coil-shaped conductors in the inductor L2 are the same (for example, 10 layers for each inductor), the number of layers of coil-shaped conductors in one of the inductors L1 and L2 may be set to 8 to 9 or 11 to 12 (that is about ±20%) as long as the number of layers of coil-shaped conductors is substantially the same between the inductors L1 and L2. Furthermore, the number of turns of each coil-shaped conductor is not necessarily 1. In FIG. 4, the via-hole conductors 44a and 44b are represented schematically as broken lines.

The coil-shaped conductors 43a and 43b are arranged between magnetic layers 42 that are adjacent to each other in the thickness direction. The plurality of coil-shaped conductors 43a are electrically connected through the via-hole conductors 44a, and the plurality of coil-shaped conductors 43b are electrically connected through the via-hole conductors 44b.

The coil-shaped conductors 43a and 43b and the via-hole conductors 44a and 44b may be made of appropriate conductive materials. The coil-shaped conductors 43a and 43b and the via-hole conductors 44a and 44b are preferably made of the same materials. The coil-shaped conductors 43a and 43b and the via-hole conductors 44a and 44b may be made of, for example, metallic paste typified by silver or copper.

In the case where a plurality of inductors having different inductances are arranged in a single inductor array chip, the number of coil-shaped conductors may be made different among the plurality of inductors. That is, the number of windings may be made different among the plurality of inductors. However, in the case where the number of windings is made different among the plurality of inductors, portions including conductive agents to define coil-shaped conductors and via-hole conductors unevenly exist. The shrinkage ratio at the time of firing differs between portions including conductive agents used to form a coil-shaped conductor and a via-hole conductor, and magnetic green sheets used to form magnetic layers. Thus, a structural defect is likely to occur at the time of firing.

In contrast, in the inductor array chip 40, by making the section size (cross-sectional area) of the coil-shaped conductor 43a differ from the section size of the coil-shaped conductor 43b, the inductance of the inductor L1 is made different from the inductance of the inductor L2. Thus, the difference between the number of the coil-shaped conductors 43a in the inductor L1 and the number of the coil-shaped conductors 43b in the inductor L2 can be reduced. Therefore, the degree of unevenness of portions including conductive agents used to form the coil-shaped conductors 43a and 43b and the via-hole conductors 44a and 44b is low. Thus, the inductor array chip 40 is easily produced with good stability since a structural defect, such as a crack, surface roughness, and waviness are less likely to occur at the time of firing.

The section sizes of all the coil-shaped conductors 43a in the inductor L1 and the section sizes of all the coil-shaped conductors 43b in the inductor L2 are not necessarily different from one another as long as the section size of at least one of the coil-shaped conductors 43a in the inductor L1 differs from the section size of at least one of the coil-shaped conductors 43b in the inductor L2. For example, in the case where the inductance of the inductor L1 approximates the inductance of the inductor L2, the section size of some of the coil-shaped conductors 43a may be made different from the section size of some of the coil-shaped conductors 43b and the section size of the other coil-shaped conductors 43a may be made the same as the section size of the other coil-shaped conductors 43b. That is, it is only preferred that the average section size of the coil-shaped conductors defining the inductor L1 differs from the average section size of the coil-shaped conductors defining the inductor L2.

The section size of the via-hole conductors 44a in the inductor L1 may be the same as or may be different from the section size of the via-hole conductors 44b in the inductor L2. In the inductor array chip 40, the inductor L1, in which the section size of the coil-shaped conductors 43a is relatively small, has an inductance greater than the inductor L2, in which the section size of the coil-shaped conductors 43b is relatively large. Thus, in the case where the operating frequency of the controller 23a is lower than the operating frequency of the controller 23b, in the case where output current of Vout1 is large, or the like, a high-efficiency DC-DC converter can be configured.

However, the present invention is not limited to this configuration. For example, the inductor L1, in which the section size of the coil-shaped conductors 43a is relatively small, may have an inductance smaller than the inductor L2, in which the section size of the coil-shaped conductors 43b is relatively large. In the case where the operating frequency of the controller 23a is higher than the operating frequency of the controller 23b, in the case where the output current of Vout1 is small, or the like, it is desirable to use this configuration.

For example, a method for increasing the thickness of a coil-shaped conductor is used as a method for setting the inductance of the inductor L1, in which the section size of the coil-shaped conductors 43a is relatively small, to be smaller than the inductance of the inductor L2, in which the section size of the coil-shaped conductors 43b is relatively large. That is, the "section size" is defined as the line width and the line thickness.

Figure 9:
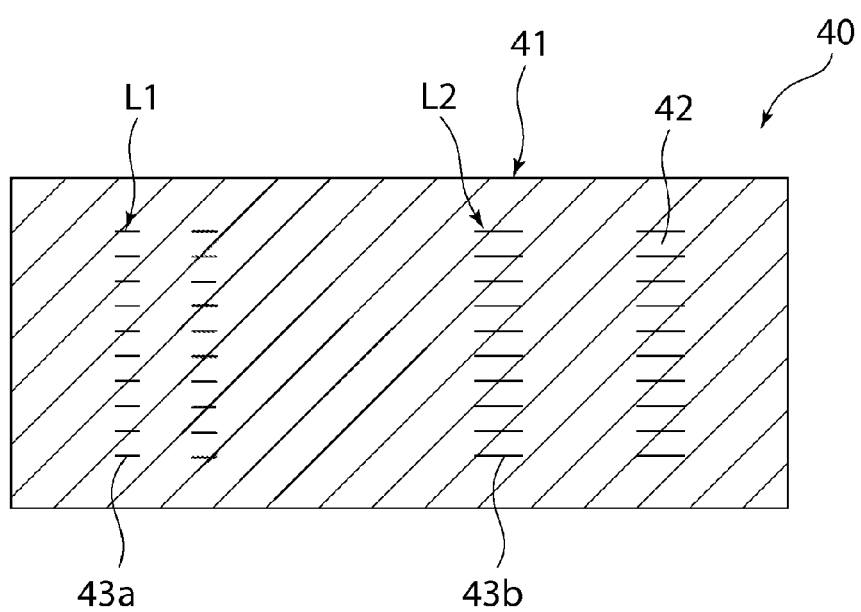
FIG. 9 is a schematic cross-sectional view of an inductor array chip according to a modification of the first preferred embodiment of the present invention.

For the inductor L1, in which the section size of the coil-shaped conductors 43a is relatively small, and the inductor L2, in which the section size of the coil-shaped conductors 43b is relatively large, the coil diameters of the coil-shaped conductors 43a and 43b may be the same or may differ from each other. For example, the coil diameter of the coil-shaped conductors 43a may be greater than the coil diameter of the coil-shaped conductors 43b, as shown in FIG. 3. In this case, the inductance of the inductor L1 is greater than the inductance of the inductor L2. For example, the coil diameter of the coil-shaped conductors 43a may be smaller than the coil diameter of the coil-shaped conductors 43b, as shown in FIG. 9. In this case, the inductance of the inductor L1 is smaller than the inductance of the inductor L2.

Here, the coil diameter of a coil-shaped conductor represents the inner diameter of a portion in which the width of the coil-shaped conductor is the largest on a straight line passing through the center of the coil-shaped conductor.

Hereinafter, other preferred embodiments of the present invention will be described. In the explanation provided below, members having substantially the same functions as those in the first preferred embodiment will be referred to with the same reference signs, and the explanation of those members will be omitted.

Second and Third Preferred Embodiments

Figure 5:
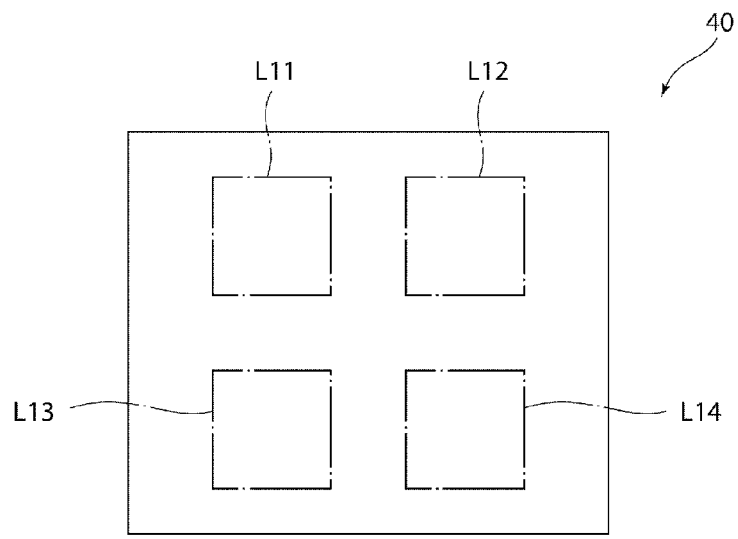
FIG. 5 is a schematic plan view of an inductor array chip according to a second preferred embodiment of the present invention.
Figure 6:
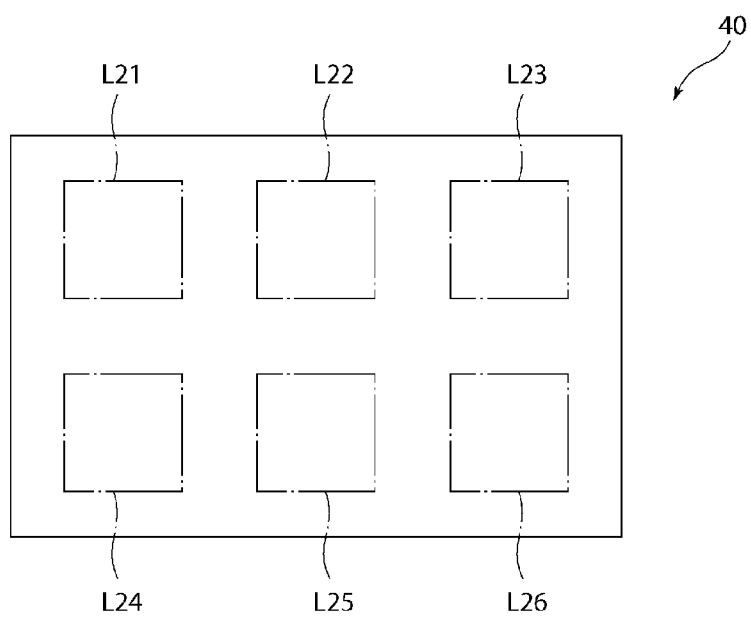
FIG. 6 is a schematic plan view of an inductor array chip according to a third preferred embodiment of the present invention.

FIG. 5 is a schematic plan view of an inductor array chip according to a second preferred embodiment of the present invention. FIG. 6 is a schematic plan view of an inductor array chip according to a third preferred embodiment of the present invention.

In the first preferred embodiment, the DC-DC converter 1 preferably includes the two converting units, 10a and 10b. The example in which the inductor array chip 40 includes the two inductors, L1 and L2, is explained in the first preferred embodiment. However, the present invention is not limited to this configuration.

For example, in the case where a DC-DC converter includes three or more converting units, three or more inductors may be provided in an inductor array chip.

For example, for the use in a DC-DC converter including four converting units, four inductors, L11, L12, L13, and L14, may be provided in the inductor array chip 40, as illustrated in FIG. 5. In this case, it is only required that the section sizes of the coil-shaped conductors differ between at least two of the inductors L11, L12, L13, and L14. Alternatively, the section sizes of the coil-shaped conductors may differ among all the inductors L11, L12, L13, and L14. For example, in the case where a current of 800 mA is flowed to the inductor L11, a current of 400 mA is flowed to the inductor L12, a current of 800 mA is flowed to the inductor L13, and a current of 200 mA is flowed to the inductor L14 in the inductor array chip 40 illustrated in FIG. 5, it is desirable that the section size S11 of the coil-shaped conductors in the inductor L11, the section size S12 of the coil-shaped conductors in the inductor L12, the section size S13 of the coil-shaped conductors in the inductor L13, and the section size S14 of the coil-shaped conductors in the inductor L14 meet the conditions described below.

$$S14<S12<S11=S13$$

For example, for use in a DC-DC converter including six converting units, six inductors, L21, L22, L23, L24, L25, and L26, may be provided in the inductor array chip 40, as illustrated in FIG. 6. In this case, it is preferred that the section sizes of coil-shaped conductors differ between at least two of the inductors L21, L22, L23, L24, L25, and L26. Alternatively, the section sizes of coil-shaped conductors may differ among all the inductors L21, L22, L23, L24, L25, and L26. For example, in the case where a current of 800 mA is flowed to the inductors L21 and L24, a current of 600 mA is flowed to the inductor L22, and a current of 500 mA is flowed to the inductors L23, L25, and L26 in the inductor array chip 40 illustrated in FIG. 6, it is desirable that the section size S21 of the coil-shaped conductors in the inductor L21, the section size S22 of the coil-shaped conductors in the inductor L22, the section size S23 of the coil-shaped conductors in the inductor L23, the section size S24 of the coil-shaped conductors in the inductor L24, the section size S25 of the coil-shaped conductors in the inductor L25, and the section size S26 of the coil-shaped conductors in the inductor L26 meet the conditions described below.

$$S23=S25=S26<S22<S21=S24$$

Other Preferred Embodiments

By providing, before firing, a loss layer made of carbon or the like on at least one conductive paste layer forming a coil-shaped conductor, a cavity may be formed on at least one coil-shaped conductor. In this case, the number of coil-shaped conductors on which a cavity is arranged may differ among a plurality of inductors. In other words, by making the number of coil-shaped conductors on which a cavity is arranged differ among the plurality of inductors, the inductances of the inductors may be made different from one another. Normally, the inductance of an inductor increases as the number of coil-shaped conductors on which a cavity is arranged increases.

In the first preferred embodiment, the case in which only one coil-shaped conductor defining an inductor preferably is arranged between magnetic layers adjacent to each other has been explained. However, the present invention is not limited to this configuration. For example, a plurality of coil-shaped conductors defining an inductor may be arranged between magnetic layers adjacent to each other. With this configuration, for example, the inductance of an inductor may be changed by changing the number of coil-shaped conductors in an inductor while setting the number of layers in which coil-shaped conductors are arranged to be the same between the inductors.

Furthermore, the number of windings of at least one coil-shaped conductor may differ among a plurality of inductors. In this case, it is desirable that the number of windings of a relatively thin coil-shaped conductor is set to be greater than the number of windings of a relatively thick coil-shaped conductor.

Fourth and Fifth Preferred Embodiments

Figure 7:
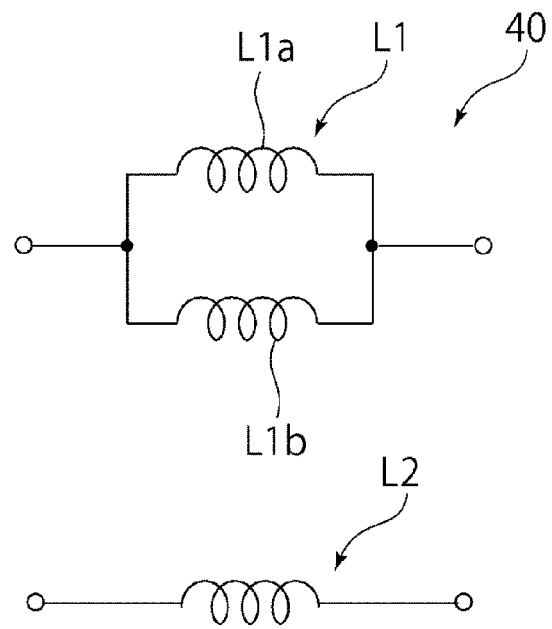
FIG. 7 is a schematic circuit diagram of an inductor array chip according to a fourth preferred embodiment of the present invention.
Figure 8:
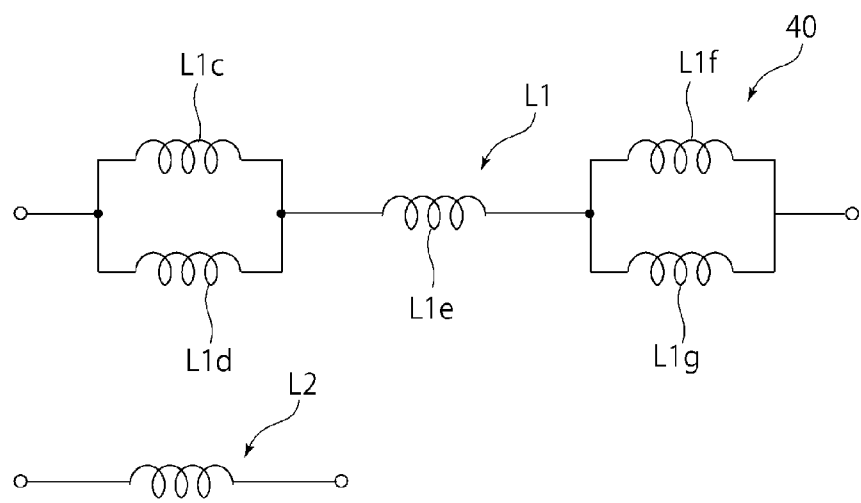
FIG. 8 is a schematic circuit diagram of an inductor array chip according to a fifth preferred embodiment of the present invention.

FIG. 7 is a schematic circuit diagram of an inductor array chip according to a fourth preferred embodiment of the present invention. FIG. 8 is a schematic circuit diagram of an inductor array chip according to a fifth preferred embodiment of the present invention.

In the fourth and fifth preferred embodiments, in at least one of the inductors L1 and L2, a plurality of coil-shaped conductors are electrically connected through via-hole conductors such that the inductor includes a plurality of inductor units connected in parallel.

More specifically, in the fourth preferred embodiment, as illustrated in FIG. 7, the inductor L2 includes a single inductor unit. Meanwhile, the inductor L1 includes a plurality of inductor units, L1a and L1b. The inductor unit L1a and the inductor unit L1b are connected in parallel to each other. Some of the plurality of coil-shaped conductors 43a defining the inductor L1 and via-hole conductors 44a that connect the some of the coil-shaped conductors 43a in series define the inductor L1a. The other coil-shaped conductors 43a and via-hole conductors 44a that connect the other coil-shaped conductors 43a in series define the inductor L1b.

In the fifth preferred embodiment, as illustrated in FIG. 8, the inductor L2 includes a single inductor unit. Meanwhile, the inductor unit L1 includes inductor units L1c to L1g. The inductor unit L1c and the inductor unit L1d are connected in parallel to each other. The inductor unit L1f and the inductor unit L1g are connected in parallel to each other. The parallel circuit of the inductor unit L1c and the inductor unit L1d, the inductor unit L1e, and the parallel circuit of the inductor unit L1f and the inductor unit L1g are connected in series to one another. The inductor unit L1c includes at least one of first coil-shaped conductors 43a of the plurality of coil-shaped conductors 43a defining the inductor L1, the inductor unit L1d includes at least one of second coil-shaped conductors 43a, the inductor unit L1e includes at least one of third coil-shaped conductors 43a, the inductor unit L1f includes at least one of fourth coil-shaped conductors 43a, and the inductor unit L1g includes at least one of fifth coil-shaped conductors 43a.

By adopting the configuration in the fourth preferred embodiment or the fifth preferred embodiment, the difference between the inductance of the inductor L1 and the inductance of the inductor L2 is significantly increased.

Furthermore, in the fourth and fifth preferred embodiments, an example in which only one of two inductors preferably includes a plurality of inductor units has been explained. However, the present invention is not limited to this configuration. For example, both the inductors may include a plurality of inductor units. In this case, among the plurality of inductors each including a plurality of inductor units, it is desirable that connection configurations of the plurality of inductor units differ from one another. For example, in an inductor array chip, the inductor L1 in the fourth preferred embodiment and the inductor L1 in the fifth preferred embodiment may be provided.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An inductor array chip comprising:
   a magnetic laminated body including a plurality of stacked magnetic layers; and
   a plurality of inductors arranged inside the magnetic laminated body, inductances of the plurality of inductors being different from one another; wherein
   each of the plurality of inductors includes:
      a plurality of coil-shaped conductors arranged between the magnetic layers; and
      a via-hole conductor that electrically connects the plurality of coil-shaped conductors;
   the plurality of coil-shaped conductors of one of the plurality of inductors have a different section size from a section size of the plurality of coil-shaped conductors of another one of the plurality of inductors;
   each of the one of the plurality of inductors and the another one of the plurality of inductors includes a same number of the coil-shaped conductors;
   at least one of the plurality of inductors includes a plurality of inductor units connected in parallel to one another; and
   each of the plurality of inductor units overlap each other in plan view.

2. The inductor array chip according to claim 1, wherein an inductance of one of the plurality of inductors including a plurality of coil-shaped conductors having a relatively small section size is greater than an inductance of another one of the plurality of inductors including a plurality of coil-shaped conductors having a relatively large section size.

3. The inductor array chip according to claim 1, wherein an inductance of one of the plurality of inductors including a plurality of coil-shaped conductors having a relatively small section size is smaller than an inductance of another one of the plurality of inductors including a plurality of coil-shaped conductors having a relatively large section size.

4. The inductor array chip according to claim 1, wherein in the one of the plurality of inductors and the another of the plurality of inductors in which the plurality of coil-shaped conductors have different section sizes, coil diameters of the coil-shaped conductors differ from one another.

5. The inductor array chip according to claim 4, wherein one of the plurality of inductors including a plurality of coil-shaped conductors having a relatively small section size has a coil diameter smaller than a coil diameter of another one of the plurality of inductors including a plurality of coil-shaped conductors having a relatively large section size.

6. The inductor array chip according to claim 4, wherein one of the plurality of inductors including a plurality of coil-shaped conductors having a relatively small section size has a coil diameter greater than a coil diameter of another one of the plurality of inductors including a plurality of coil-shaped conductors having a relatively large section size.

7. The inductor array chip according to claim 1, wherein the plurality of inductors include a plurality of inductors each including a plurality of inductor units; and
in the plurality of inductors each including a plurality of inductor units, connection configurations of the plurality of inductor units differ from one another.

8. The inductor array chip according to claim 1, wherein a first of the plurality of inductors includes one inductor unit and a second of the plurality of inductors includes a plurality of inductor units.

9. The inductor array chip according to claim 8, wherein the plurality of inductor units of the second of the plurality of inductors are connected to each other in parallel.

* * * * *